United States Patent
Kim et al.

(10) Patent No.: US 12,195,166 B2
(45) Date of Patent: Jan. 14, 2025

(54) METHOD FOR MANUFACTURING PROPULSION UNIT HAVING RIM FOIL, AND PROPULSION UNIT AND FLYING VEHICLE MANUFACTURED BY THE SAME

(71) Applicant: METROAIR INC., Goyang-si (KR)

(72) Inventors: Hak Yoon Kim, Chungcheongnam-do (KR); Seung Won Lee, Namyangju-si (KR)

(73) Assignee: METROAIR INC, Goyang-si (KR)

(*) Notice: Subject to any disclaimer, the term of this patent is extended or adjusted under 35 U.S.C. 154(b) by 23 days.

(21) Appl. No.: 18/076,344

(22) Filed: Dec. 6, 2022

(65) Prior Publication Data

US 2023/0116741 A1 Apr. 13, 2023

Related U.S. Application Data

(63) Continuation of application No. PCT/KR2020/017750, filed on Dec. 7, 2020.

(30) Foreign Application Priority Data

Aug. 7, 2020 (KR) .................. 10-2020-0099414

(51) Int. Cl.
*B64C 11/00* (2006.01)
*B64C 29/00* (2006.01)
(Continued)

(52) U.S. Cl.
CPC ........ *B64C 11/001* (2013.01); *B64C 29/0025* (2013.01); *B64U 30/26* (2023.01);
(Continued)

(58) Field of Classification Search
CPC ..... B64C 11/001; B64C 39/062; B64C 27/20; B64C 29/0025; B64U 30/26; B64U 10/20
See application file for complete search history.

(56) References Cited

U.S. PATENT DOCUMENTS 5,150,857 A * 9/1992 Moffitt .................. B64U 20/65
244/34 A
10,472,064 B2 11/2019 Tian
(Continued)

FOREIGN PATENT DOCUMENTS

| JP | 2019-025957 A | 2/2019 |
|---|---|---|
| KR | 10-2016-0041697 A | 4/2016 |
| KR | 10-2018-0099522 A | 9/2018 |

OTHER PUBLICATIONS

International Search Report of PCT/KR2020/017750 mailed Aug. 10, 2021 from Korean Intellectual Property Office.

*Primary Examiner* — Brady W Frazier
*Assistant Examiner* — Peter A Taraschi
(74) *Attorney, Agent, or Firm* — Revolution IP, PLLC

(57) ABSTRACT

A method for manufacturing a propulsion unit having a rim foil, which significantly reduces drag during forward flight while protecting a rotor blade from surrounding obstacles, the method including a plate member formation step in which an airfoil-type plate member is formed to have an outline forming an airfoil shape in side view, a rim foil formation step in which a through-hole is formed in the airfoil type plate member to form a rim foil member having an outline forming at least a portion of an airfoil shape in side view, and a rotor blade installation step in which a rotor blade is installed in the through-hole.

10 Claims, 8 Drawing Sheets

(51) Int. Cl.
  *B64U 10/16* (2023.01)
  *B64U 10/20* (2023.01)
  *B64U 30/10* (2023.01)
  *B64U 30/26* (2023.01)
  *B64U 30/297* (2023.01)
  *B64U 101/61* (2023.01)

(52) U.S. Cl.
  CPC .............. *B64U 10/16* (2023.01); *B64U 10/20* (2023.01); *B64U 30/10* (2023.01); *B64U 30/297* (2023.01); *B64U 2101/61* (2023.01)

(56) References Cited

U.S. PATENT DOCUMENTS

| | | |
|---|---|---|
| 2003/0062443 A1 | 4/2003 | Wagner et al. |
| 2004/0113013 A1* | 6/2004 | Pica ........................ B64C 27/32 244/10 |
| 2013/0062455 A1* | 3/2013 | Lugg ........................ B64C 39/12 244/12.3 |
| 2014/0151494 A1* | 6/2014 | Cvrlje ...................... B64C 27/20 244/6 |
| 2015/0012154 A1* | 1/2015 | Senkel .................... B64D 17/80 701/4 |
| 2018/0244367 A1 | 8/2018 | Kiesewetter et al. |
| 2020/0039629 A1* | 2/2020 | Bosworth ............... B64C 25/32 |
| 2020/0062139 A1* | 2/2020 | Fauri .................... B64C 29/0025 |
| 2020/0062377 A1 | 2/2020 | Reichensperger et al. |

* cited by examiner

[FIG. 1]
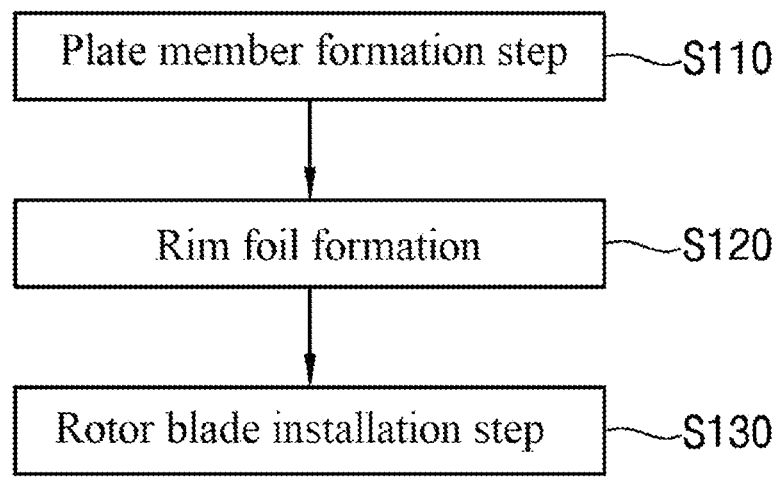
[FIG. 2]
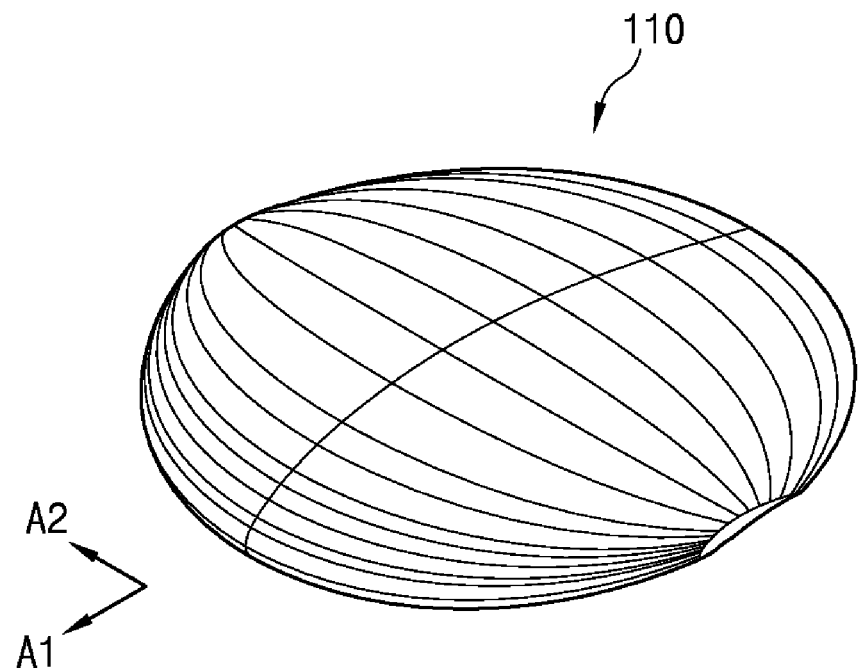

[FIG. 3]
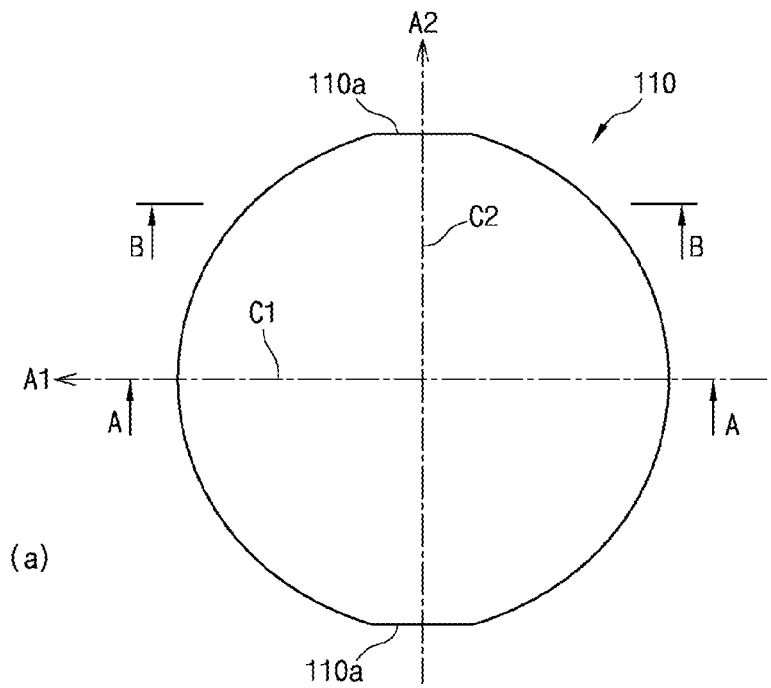
(a)
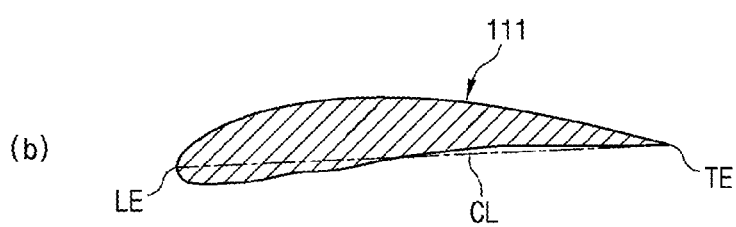
(b)
< A-A cross-section >
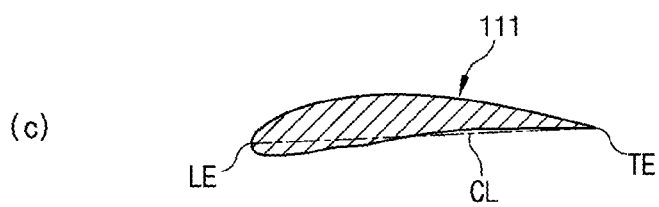
(c)
< B-B cross-section >

[FIG. 4]
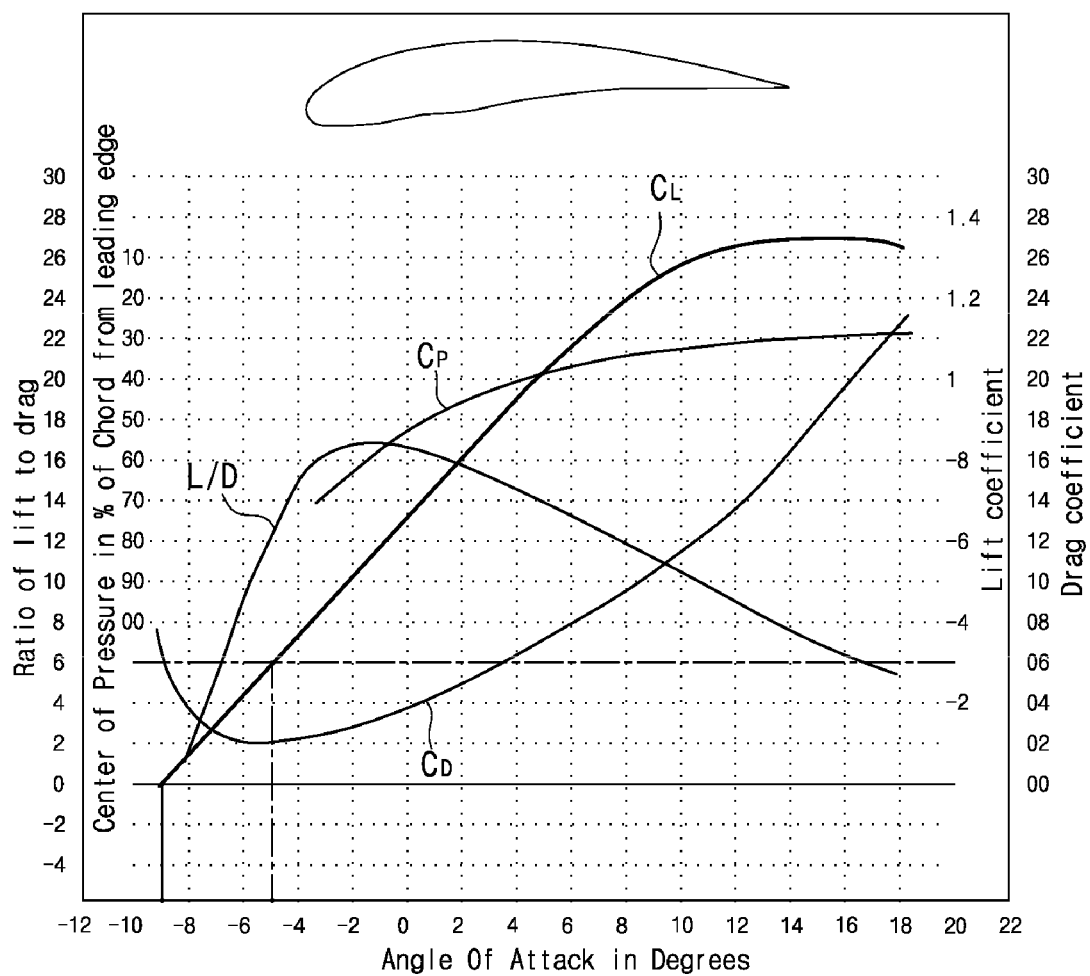

[FIG. 5]
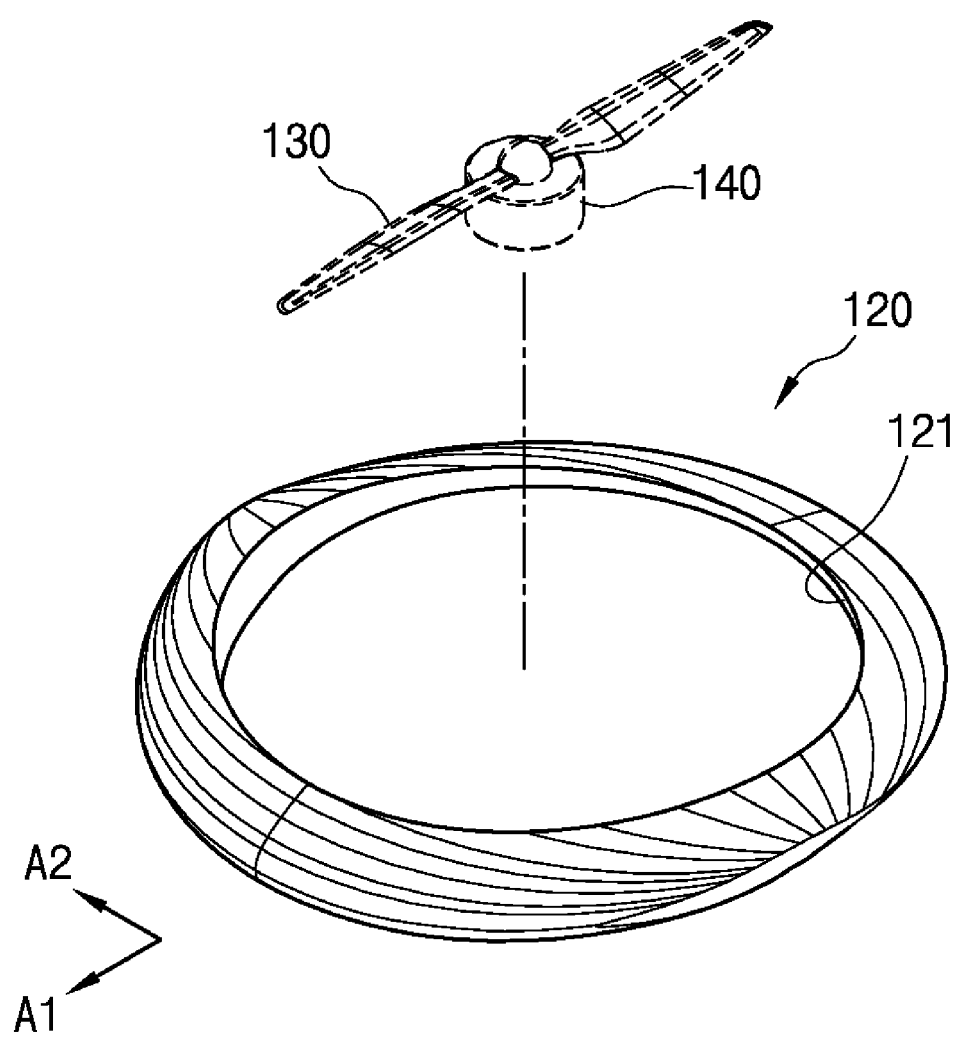

[FIG. 6]
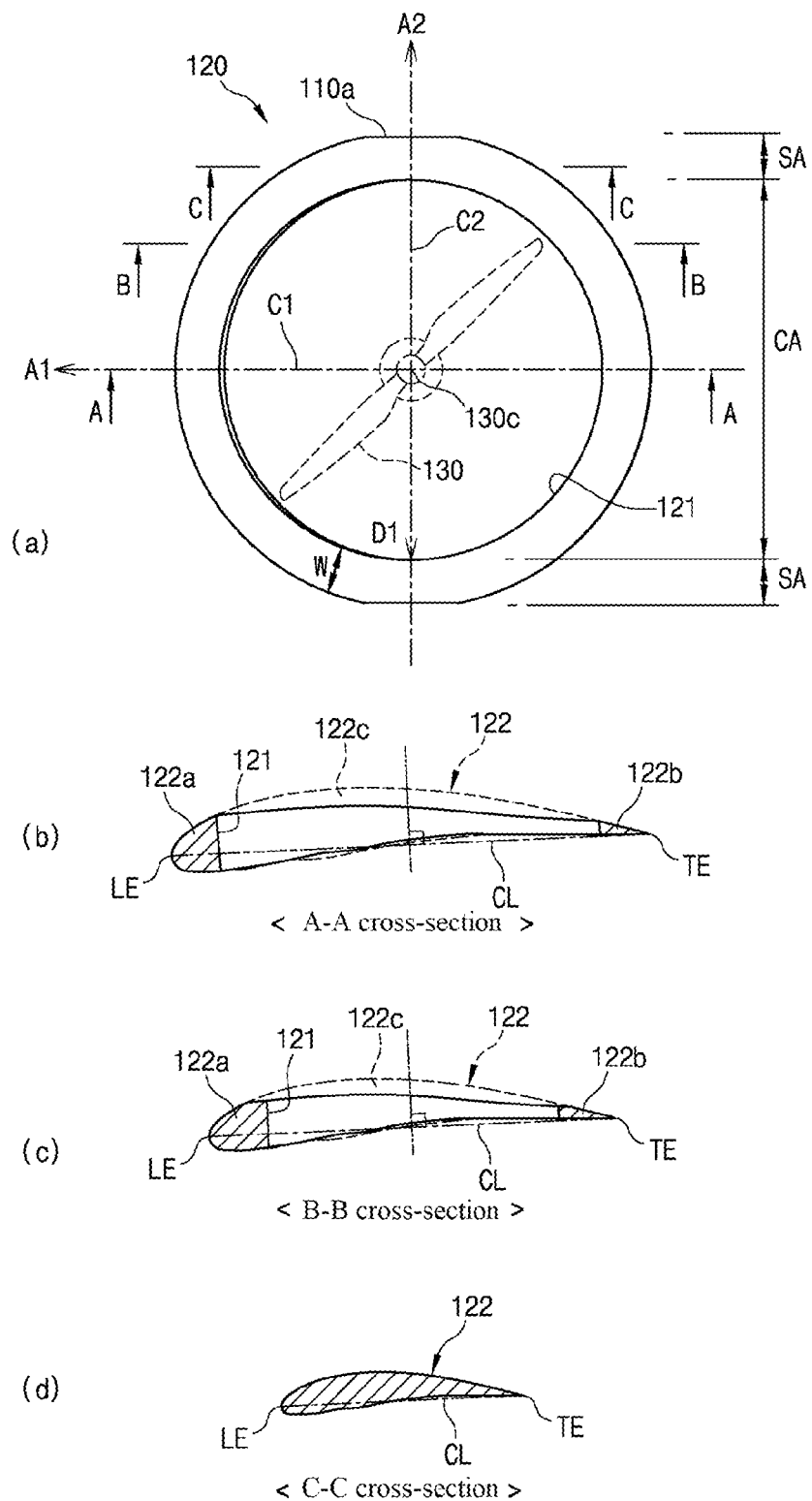

[FIG. 7]
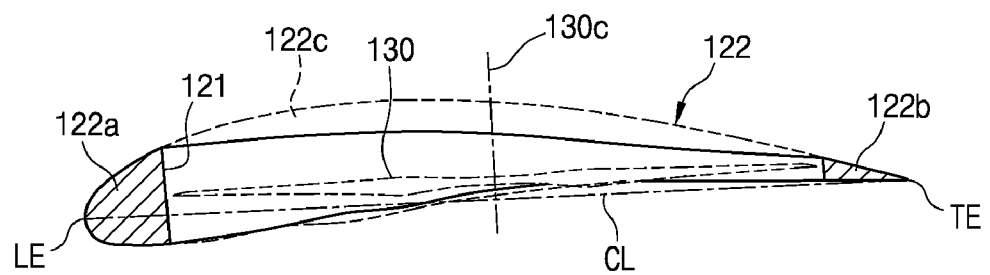

[FIG. 8]
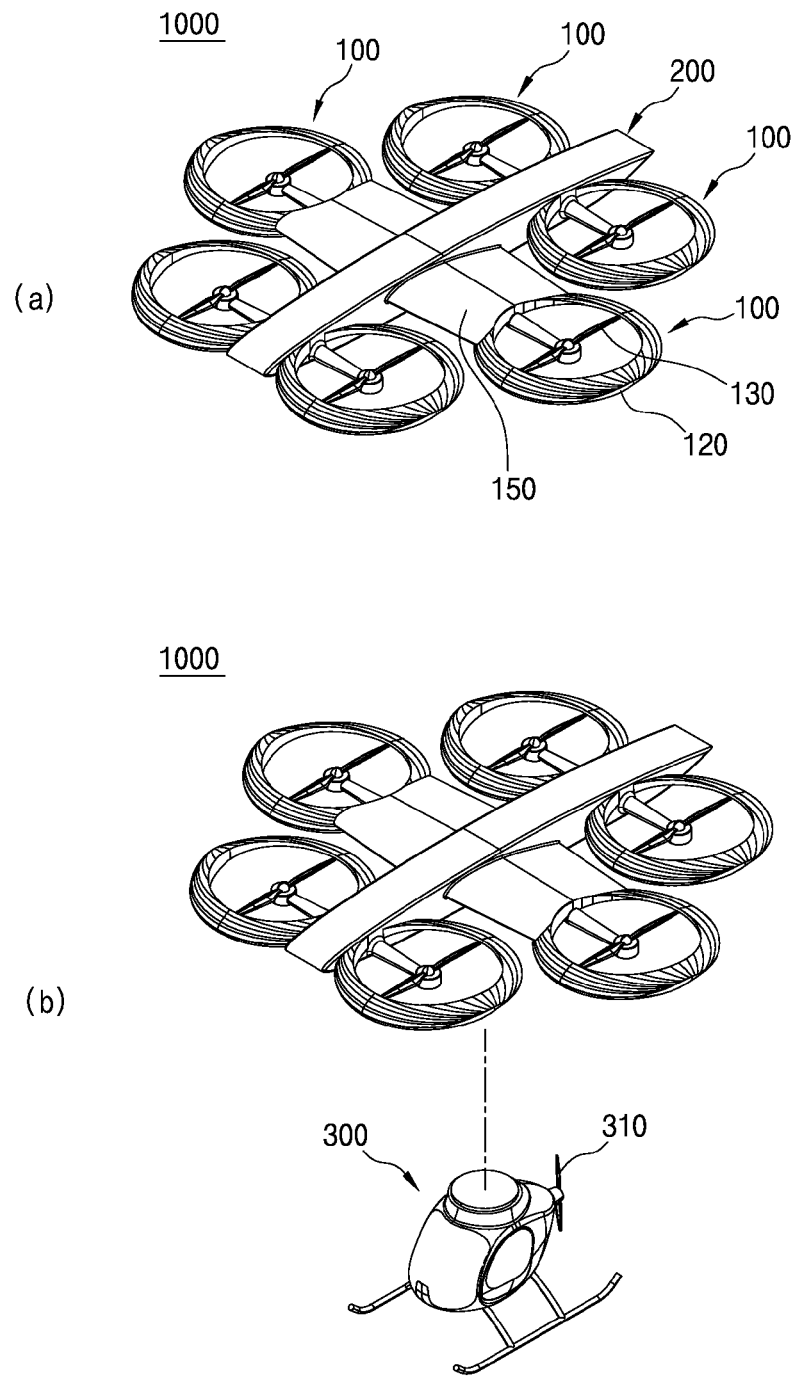

[FIG. 9]
(a)
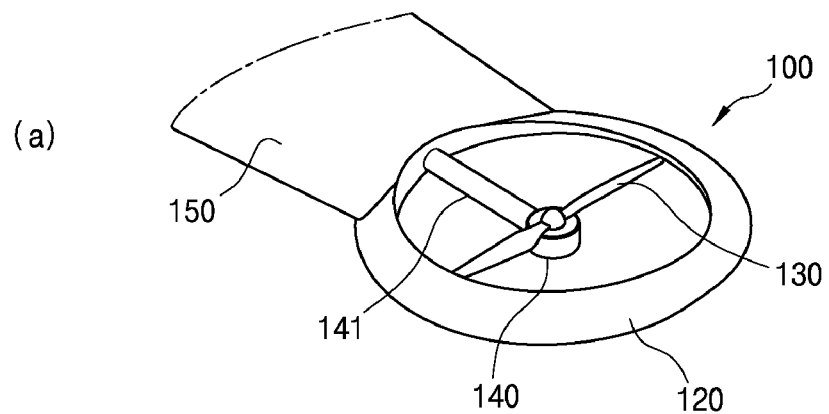
(b)
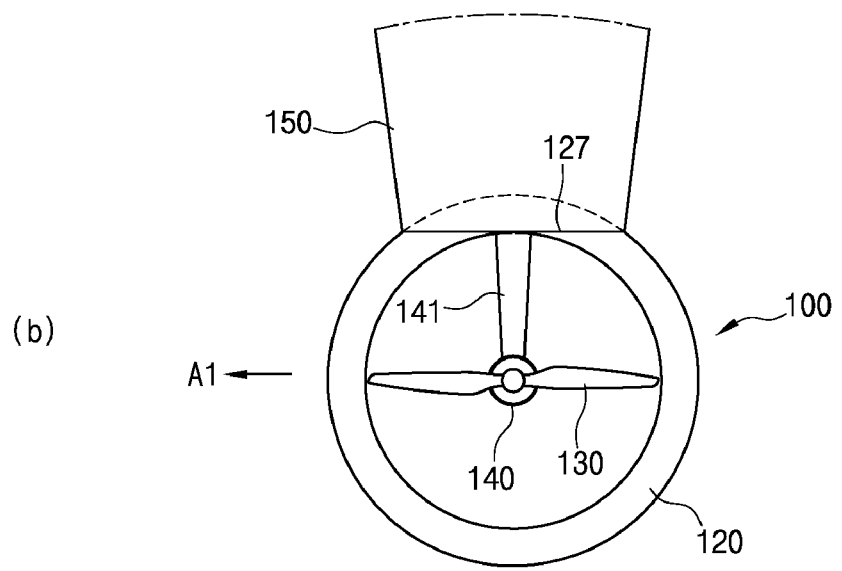

1

METHOD FOR MANUFACTURING PROPULSION UNIT HAVING RIM FOIL, AND PROPULSION UNIT AND FLYING VEHICLE MANUFACTURED BY THE SAME

TECHNICAL FIELD

The present invention relates to a method for manufacturing a propulsion unit having a rim foil, a propulsion unit manufactured by the same, and a flying vehicle including the propulsion unit. More particularly, the present invention relates to a method for manufacturing a propulsion unit having a rim foil capable of significantly reducing drag during forward flight, a propulsion unit manufactured by the same, and a flying vehicle including the propulsion unit.

BACKGROUND ART

Recently, use of unmanned flying vehicles is rapidly increasing in many applications such as surveillance, reconnaissance, distribution, and leisure activities. In particular, a multi-rotor unmanned flying vehicle is a rotorcraft and is capable of moving in all directions and hovering as well as vertical take-off and landing. In addition, such a multi-rotor unmanned flying vehicle has the advantages of a simple structure and good efficiency, as compared with other flying vehicles such as coaxial rotorcrafts and single-rotor flying vehicles.

However, in the case of a rotorcraft, since a rotor blade thereof is completely exposed to an outside environment, there is a possibility that the rotor blade will be caught on an obstacle such as tree branches, making it difficult to maintain flight. In addition, when the rotorcraft files close to a crowded area, people can be injured by rotational force of the rotor blade. In particular, in design of urban air mobility using large unmanned flying vehicles such as multi-rotor unmanned flying vehicles, it is necessary to consider the danger of a rotor blade exposed to an outside environment, the possibility of a crash in a downtown area, which can cause serious casualties, and difficulty in blocking noise from a tip of the rotor blade.

In order to solve such problems, a rotor blade protection ring or duct covering a rotor blade is additionally disposed to protect the rotor blade from obstacles and to prevent people from being injured by the rotor blade. In addition, such a rotor blade protection ring or duct has the benefit of reducing thrust loss during vertical take-off and landing by guiding the flow of air passing through the rotor blade.

However, since the rotor blade protection ring or duct is designed in consideration of only flow characteristics of air passing through a rotor blade during vertical take-off and landing of a flying vehicle, there is a problem in that drag on the flying vehicle during forward flight can significantly increase.

As a related art of the present invention, there is Korean Patent Laid-open publication No. 2016-0041697 (issued on Apr. 18, 2016).

DISCLOSURE

Technical Problem

Embodiments of the present invention are conceived to solve such problems in the art and it is an object of the present invention to provide a method for manufacturing a propulsion unit having a rim foil which can significantly reduce drag during flight while protecting a rotor blade from surrounding obstacles, a propulsion unit manufactured by the same, and a flying vehicle including the propulsion unit.

Technical Solution

In accordance with one aspect of the present invention, a method for manufacturing a propulsion unit having a rim foil includes: a plate member formation step in which an airfoil-type plate member is formed to have an outline forming an airfoil shape in side view; a rim foil formation step in which a through-hole is formed in the airfoil type plate member to form a rim foil member having an outline forming at least a portion of the airfoil shape in side view; and a rotor blade installation step in which a rotor blade is installed in the through-hole.

A projection area of the airfoil-type plate member in plan view may cover a projection area of the rotor blade and the airfoil-type plate member may be continuously changed in cross-sectional scale parallel to a forward direction.

At least some cross-sections of the rim foil member may include a leading cross-sectional region having a leading edge at a front end thereof and a trailing cross-sectional region having a trailing edge at a rear end thereof.

An empty cross-sectional region, which is a portion of the through-hole in which the rotor blade is installed, may be placed between the leading cross-sectional region and the trailing cross-sectional region.

In the plate member formation step, an airfoil-shaped cross-section of the airfoil-type plate member may be set to have a zero-lift angle of attack of −9 degrees to −5 degrees.

In the rim foil formation step, the through-hole may be formed in a direction perpendicular to a chord line of an airfoil-shaped cross-section of the rim foil member.

In the rotor blade installation step, an axis of rotation of the rotor blade may be placed perpendicular to a chord line of an airfoil-shaped cross-section of the rim foil member such that the chord line is parallel to the rotor blade.

In accordance with another aspect of the present invention, a propulsion unit manufactured by the method set forth above is provided.

In accordance with a further aspect of the present invention, a flying vehicle includes: a body; and the propulsion unit having the rim foil set forth above, the propulsion unit allowing the body to fly.

The flying vehicle may further include: a fixed wing disposed between the body and the rim foil member, wherein the rim foil member and the fixed wing may have the same airfoil-shaped cross section.

The flying vehicle may further include: a passenger capsule coupled to the body, the passenger capsule having a forward thrust rotor blade producing forward thrust.

Advantageous Effects

With the airfoil-type rim having an airfoil-shaped cross section, the propulsion unit according to the present invention can minimize damage to a rotor blade due to surrounding obstacles and related accidents and can significantly increase lift and thrust of a flying vehicle through reduction in drag during flight.

In addition, the propulsion unit according to the present invention can reduce noise through suppression of generation of a vortex around a tip of the rotor blade.

DESCRIPTION OF DRAWINGS

FIG. 1 is a flowchart of a method for manufacturing a propulsion unit having a rim foil according to one embodiment of the present invention.

FIG. 2 is a perspective view of an airfoil-type plate member manufactured according to one embodiment of the present invention.

FIG. 3 shows a plan view (a) of the airfoil-type plate member of FIG. 1, a sectional view taken along line A-A of FIG. 3(a), and a sectional view taken along line B-B of FIG. 3(a).

FIG. 4 is a graph showing parameters of an airfoil according to one embodiment of the present invention.

FIG. 5 is a perspective view of a rim foil member manufactured according to one embodiment of the present invention.

FIG. 6 shows a plan view (a) of the rim foil member of FIG. 5, a sectional view (b) taken along line A-A of the plan view (a), a sectional view (c) taken along line B-B of the plan view (a), and a sectional view (d) taken along line C-C of the plan view (a).

FIG. 7 is a side sectional view illustrating installation of a rotor blade according to one embodiment of the present invention.

FIG. 8 is a perspective view of a flying vehicle according to one embodiment of the present invention.

FIG. 9 shows an enlarged perspective view (a) and plan view (b) of a propulsion unit of FIG. 8.

MODE FOR INVENTION

Hereinafter, preferred embodiments of the present invention will be described with reference to the accompanying drawings. In description of the embodiments, the same components will be denoted by the same terms and the same reference numerals and redundant description thereof will be omitted.

Embodiments of the present invention provide a method of manufacturing a propulsion unit having a rim foil that can reduce drag during flight while protecting a rotor blade from surrounding obstacles.

Herein, the term "rim foil" refers to a streamlined rim for protection of a rotor blade, which covers the rotor blade to minimize damage to the rotor blade due to surrounding obstacles and related accidents and has an airfoil shape in side view to maximize lift and minimize drag during forward flight.

The term "airfoil" generally refers to a streamlined structure that is designed to maximize lift and minimize drag during motion in a fluid, such as a fixed wing, a rudder, or a cross-section of a rotor blade. The magnitudes of lift and drag on the airfoil depend on a chord line, which is a straight line connecting tips of leading and trailing edges of the air foil. In addition, an angle of attack, which is an angle between the chord line and a direction of a relative airflow, is also known as a key factor in determining the magnitude of lift.

FIG. 1 is a flowchart of a method for manufacturing a propulsion unit having a rim foil according to one embodiment of the present invention.

Referring to FIG. 1, the method of manufacturing a propulsion unit having a rim foil according to this embodiment includes a plate member formation step S110, a rim foil formation step S120, and a rotor blade installation step S130.

FIG. 2 is a perspective view of an airfoil-type plate member manufactured according to one embodiment of the present invention, and FIG. 3 shows a plan view (a) of the airfoil-type plate member of FIG. 1, a sectional view taken along line A-A of FIG. 3(a), and a sectional view taken along line B-B of FIG. 3(a).

Referring further to FIG. 2 and FIG. 3, in the plate member formation step S110, an airfoil-type plate member 110 is formed.

The airfoil-type plate member 110 according to this embodiment may have an outline forming an airfoil shape in side view.

A projection area of the airfoil-type plate member 110 in plan view may cover a projection area of a rotor blade 130

In addition, the airfoil-type plate member 110 may be continuously changed in cross-sectional scale parallel to a forward direction.

That is, as shown in FIG. 3(a), the airfoil-type plate member 110 may gradually decrease in airfoil-shaped cross-sectional area 111 from a center line C1 in the forward direction A1 toward both ends in a lateral direction A2 perpendicular to the forward direction A1.

In addition, the airfoil-type plate member 110 may be partially cut at both ends thereof in the lateral direction A2 perpendicular to the forward direction A1 such that both lateral ends of the airfoil-type plate member 110 have a vertical surface 110a.

The airfoil-type plate member 110 may be solid inside, as shown in FIG. 3. However, it will be understood that the present invention is not limited thereto and the airfoil-type plate member 110 may have An empty portion therein.

The airfoil-type plate member 110 according to this embodiment may be manufactured by cutting a surface of a plate member such that the plate member has an airfoil shape or by bending a plate member into an airfoil shape. Alternatively, the airfoil-type plate member 110 may be manufactured by assembling multiple plate members into an airfoil shape.

In the plate member formation step S110 according to this embodiment, a zero-lift angle of attack of the airfoil-shaped cross-section 111 of the airfoil-type plate member 110 may be set to a negative (−) value.

Sometimes a rotorcraft such as a helicopter flies forward with a body thereof including a rotor blade 130 slightly tilted with respect to the forward direction A1 to obtain thrust.

If the zero-lift angle of attack of the airfoil-shaped cross-section is set to maintain zero degrees, an angle of attack of the airfoil-shaped cross-section is changed to a negative value when the rotorcraft tilts the body thereof with respect to the forward direction during forward flight, causing generation of negative lift (downward force) and increase in drag.

Conversely, if an airfoil having a negative (−) zero-lift angle of attack is designed upon setting of the airfoil-shaped cross-section of the airfoil-type plate member 110 as in this embodiment, the airfoil-shaped cross-section 111 can maintain an angle of attack corresponding to a positive (+) lift coefficient even when the rotorcraft flies forward with the body thereof including the rotor blade 130 tilted with respect to the forward direction A1 to obtain thrust. Accordingly, it is possible to further reduce drag due to the shape of the airfoil during forward flight.

According to this embodiment, the zero-lift angle of attack of the airfoil-shaped cross-section 111 is preferably set within the range of −9 degrees to −5 degrees.

Here, the angle of −9 degrees to −5 degrees may correspond to the maximum angle to which the airfoil-shaped cross-section 111 can be tilted with respect to the forward direction A1 during forward flight.

FIG. 4 is a graph showing parameters of an airfoil according to one embodiment of the present invention, specifically a ratio of lift to drag (L/D), a lift coefficient (CL), a drag coefficient (CD), and a center of pressure (CP)

in % of chord from leading edge depending on the angle of attack (in degrees) of the airfoil.

Referring to FIG. 4, the selected airfoil is set to have a zero-lift angle of attack of −9 degrees.

Since the airfoil of FIG. 4 has a zero-lift angle of attack of −9 degrees, the airfoil can always have a positive (+) lift coefficient during forward flight so long as the airfoil maintains a tilt angle of less than 9 degrees with respect to the forward direction. Accordingly, if a flying vehicle flies forward with the tilt angle thereof maintained at a value less than 9 degrees, drag due to the cross-sectional shape of the airfoil can be reduced while further increasing lift and thrust.

FIG. 5 is a perspective view of a rim foil member manufactured according to one embodiment of the present invention, and FIG. 6 shows a plan view (a) of the rim foil member of FIG. 5, a sectional view (b) taken along line A-A of FIG. 6(a), a sectional view (c) taken along line B-B of FIG. 6(a), and a sectional view (d) taken along line C-C of FIG. 6(a).

After formation of the airfoil-type plate member 110 is completed, the airfoil-type plate member 110 is formed into a rim foil member.

Referring further to FIG. 5 and FIG. 6, in the rim foil formation step S120, the rim foil member 120 is formed from the airfoil-type plate member 110.

The rim foil member 120 according to this embodiment may be formed by forming a through-hole 121 in the airfoil-type plate member 110.

The through-hole 121 defines an inner diameter of the rim foil member 120 and is adapted for the rotor blade 130 to be installed therein. The through-hole 121 may have a larger diameter than the rotor blade 130.

The through-hole 121 may be formed in a direction perpendicular to the chord line CL of the airfoil-shaped cross-section 111. Thus, the through-hole 121 may guide an airflow passing through the rotor blade 130 in a downward direction.

The rim foil member 120 thus manufactured may have an annular shape, and may have an inner diameter D1 larger than the diameter of the rotor blade 130. In addition, the rim foil member 120 may have a constant width W along the entire circumference thereof excluding the vertical surface 110a.

The rim foil member 120 may have an outline forming at least a portion of an airfoil shape in side view. At least some cross-sections of the rim foil member 120 may include a leading cross-sectional region 122a having a leading edge at a front end thereof and a trailing cross-sectional region 122b having a trailing edge at a rear end thereof.

That is, with reference to the lateral direction A2 perpendicular to the forward direction A1, the rim foil member 120 may have a central area CA in which the rotor blade 130 is disposed and a side area SA lying on both lateral sides of the central area CA, as shown in FIG. 6(a).

As shown in FIG. 6(b) and FIG. 6(c), the central area CA of the rim foil member 120 includes the leading cross-sectional region 122a having the leading edge at the front end thereof and the trailing cross-sectional region 122b having the trailing edge at the rear end thereof in cross-section parallel to the forward direction A1.

An empty cross-sectional region 122c, which is a portion of the through-hole 121, is placed between the leading cross-sectional region 122a and the trailing cross-sectional region 122b. Here, the empty cross-sectional region 122c is a virtual cross-sectional region connecting the leading cross-sectional region 122a to the trailing cross-sectional region 122b.

An outline encompassing the leading cross-sectional region 122a, the hollow cross-sectional region 122c, and the trailing cross-sectional region 122b forms an airfoil shape 122 corresponding to the airfoil-shaped cross-section 111 of the airfoil-type plate member 110.

In addition, as shown in FIG. 6(d), the side area SA of the rim foil member 120 may also have an airfoil shape corresponding to the airfoil-shaped cross-section 111 of the airfoil-type plate member 110 in cross-section parallel to the forward direction A1, wherein the airfoil shape does not include the empty cross-sectional region 122c.

Accordingly, the leading cross-sectional region 122a including the leading edge LE can reduce drag during forward flight, and the trailing cross-sectional region 122b including the trailing edge TE can suppress excessive generation of a vortex in a region behind the rim foil during forward flight.

In addition, since the rotor blade 130 disposed inside the through-hole 121 is not exposed outside the rim foil member 120 in side view, it is possible to minimize damage to the rotor blade 130 due to surrounding obstacles and related accidents during operation of the rotor blade 130.

In addition, the rotor blade 130 placed inside the through-hole 121 can avoid an airflow guided by the rim foil member 120.

Accordingly, the rim foil member 120 can reduce drag against a relative airflow during forward flight while further increasing lift and thrust.

The rim foil member 120 may be provided at both lateral ends thereof with the vertical surface 110a formed in the plate member formation step S110. The vertical surface 110a allows a body or fixed wing of a flying vehicle to be coupled thereto.

After manufacture of the rim foil member 120 is completed, the rotor blade 130 is installed.

That is, in the rotor blade installation step S130, the rotor blade 130 is installed in the through-hole 121 of the rim foil member 120.

FIG. 7 is a side sectional view illustrating installation of the rotor blade according to one embodiment of the present invention.

Referring further to FIG. 7, the rotor blade 130 may be disposed inside the through-hole 121.

Here, an axis of rotation 130c of the rotor blade 130 may be placed perpendicular to the chord line CL of the airfoil cross-section 111 such that the rotor blade 130 is parallel to the chord line CL.

In other words, a center line of the through-hole 121 and the axis of rotation 130c of the rotor blade 130 may be collinear with each other. Accordingly, not only can the rotor blade 130 be placed with a gap between the rotor blade and the through-hole 121 minimized, but an airflow passing through the rotor blade 130 can be guided downwards in a stable and uniform manner by the through-hole 121.

In addition, through appropriate regulation and design change of a gap between the inner diameter D1 of the through-hole 121 and a tip of the rotor blade 130, generation of a vortex around the tip of the rotor blade 130 can be controlled, thereby achieving noise reduction.

In addition, since the rotor blade 130 disposed inside the through-hole 121 is not exposed outside the rim foil member 120 in side view, it is possible to minimize damage to the rotor blade 130 due to surrounding obstacles and related accidents during operation of the rotor blade 130.

After positioning of the rotor blade 130, a drive unit 140 may be connected to the axis of rotation 130c of the rotor blade 130. The drive unit 140 is configured to rotate the rotor blade 130, and may include a motor directly connected to the axis of rotation 130c of the rotor blade 130.

Next, a flying vehicle according to one embodiment of the present invention will be described.

FIG. 8 is a perspective view of a flying vehicle according to one embodiment of the present invention, and FIG. 9 shows an enlarged perspective view (a) and plan view (b) of a propulsion unit of FIG. 8.

Referring to FIG. 8 and FIG. 9, the flying vehicle 1000 according to this embodiment may include a body 200 and a propulsion unit 100.

The body 200 may provide a space for storing articles or carrying people. For example, when the flying vehicle is an unmanned flying vehicle, the body 200 may provide a space for storing a battery, a camera, communication parts, control parts, and the like. In addition, when the flying vehicle is a manned flying vehicle, the body 200 may provide a space for an engine, communication parts, control parts, a cockpit, a passenger compartment, and the like. The body 200 may have any suitable shape.

The flying vehicle 1000 according to this embodiment may further include a passenger capsule 300.

The passenger capsule 300 may be coupled to the body 200, and may provide an additional space for carrying cargo or passengers as needed. The passenger capsule 300 may be detachably coupled to the body 200. The passenger capsule 300 may have any suitable shape.

In addition, the passenger capsule 300 may be provided with a forward thrust rotor blade 310.

With the forward thrust rotor blade 310 provided to the passenger capsule 300, a tilt angle of the flying vehicle 1000 including the propulsion unit 100 during forward flight of the flying vehicle 1000 can be reduced, thereby further increasing lift generated by the propulsion unit 100 having the rim foil while increasing thrust of the flying vehicle 1000.

The propulsion unit 100 allows the body 200 to fly by generating an airflow in a downward direction of the body 200.

The propulsion unit 100 may include a rotor blade 130, a drive unit 140 rotating the rotor blade 130, and an annular rim foil member 120 surrounding the rotor blade 130. Redundant description of the propulsion unit 100 having the rim foil will be omitted.

The body 200 may be connected to one or more propulsion units 100, wherein the propulsion units 100 may be radially arranged from a center of the body 200. Although the flying vehicle is illustrated as including six propulsion units 100 in this embodiment, it will be understood that the present invention is not limited thereto and the flying vehicle may include any suitable number of propulsion units.

The flying vehicle 1000 according to this embodiment may further include a fixed wing 150.

The fixed wing 150 may be disposed may be disposed between the body 200 and the propulsion unit 100, and may have an airfoil-shaped cross section. Here, the fixed wing 150 and the rim foil member 120 may have the same airfoil-shaped cross-section.

The fixed wing 150 may be coupled at one end thereof to the body 200 and may be coupled at the other end thereof to the rim foil member 120 of the propulsion unit 100. The fixed wing 150 can further increase lift of the flying vehicle 1000 while securing more stable flight.

In addition, the fixed wing 150 may be provided at the other end thereof with a cantilever-type support beam 141 to support the rotor blade 130 and the drive unit 140.

The support beam 141 may have various cables embedded therein to supply power to the drive unit 140 or to control the propulsion unit 100.

In addition, the support beam 141 may extend from a tip of the fixed wing 150 to the propulsion unit 100 without protruding beyond upper and lower surfaces of each of the fixed wing 150 and the rim foil member 120 so as to avoid an airflow guided along the surfaces of the fixed wing 150 and the rim foil member 120. That is, a cross-sectional width of the support beam 141 may be smaller than that of the tip of the fixed wing, at which the support beam 141 is disposed, and may be smaller than that of a fixed wing coupling portion provided to the rim foil member 120.

Alternatively, the support beam 141 may be disposed under the fixed wing 150 and the rim foil member 120. In this case, the cantilever-type support beam 141 extending from the fixed wing 150 can more stably support the propulsion unit 100.

The other end of the fixed wing 150 may be coupled to the vertical surface 110a (see FIG. 6) of the rim foil member 120. Here, robustness of coupling therebetween can be weakened depending on the dimensions of the fixed wing 150 and the propulsion unit 100.

In order to solve this problem, one end of the rim foil member 120 coupled to the fixed wing 150 may be cut to form a coupling surface 127. The coupling surface 127 allows coupling between the fixed wing 150 and the rim foil member 120 to be established over a wider area, thereby ensuring stable coupling between the fixed wing 150 and the propulsion unit 100. In addition, the coupling surface 127 allows a cross-section at a joint between the fixed wing 150 and the rim foil member 120 to retain an airfoil shape, thereby increasing lift.

In addition, upon setting of the airfoil shape of the fixed wing 150, a zero-lift angle of attack formed between a chord line CL of the airfoil shape and a relative airflow is set to have a negative (−) value. Accordingly, a lift coefficient of the fixed wing 150 can maintain a positive (+) value even when the flying vehicle 1000 flies forward with the fixed wing 150 tilted with respect to the forward direction A1 to obtain thrust, whereby drag on the flying vehicle 1000 during forward flight can be reduced while further increasing lift and thrust.

Although some embodiments have been described herein, it should be understood that various modifications, changes, alterations, and equivalent embodiments can be made by those skilled in the art without departing from the spirit and scope of the invention.

INDUSTRIAL APPLICABILITY

With the airfoil-type rim having an airfoil-shaped cross section, the propulsion unit according to the present invention can minimize damage to a rotor blade due to surrounding obstacles and related accidents during flight, can significantly increase lift and thrust of a flying vehicle through reduction in drag during flight, and can reduce noise through suppression of generation of a vortex around a tip of the rotor blade. Thus, the propulsion unit may be widely used in the aircraft industry, such as drones and vertical take-off and landing flying vehicles.

The invention claimed is:

1. A method for manufacturing a propulsion unit having a rim foil, comprising:

a plate member formation step in which an airfoil-type plate member is formed to have an outline forming an airfoil shape in side view, wherein the airfoil shape includes an upper surface which is formed curving upwardly and a lower surface which is formed curving upwardly;

a rim foil formation step in which a through-hole is formed in the airfoil type plate member to form a rim foil member having an outline forming at least a portion of the airfoil shape in side view; and a rotor blade installation step in which a rotor blade is installed in the through-hole, wherein the airfoil-type plate member is continuously changed in cross-sectional thickness parallel to a forward direction, and decreases in an airfoil-shaped cross-section thickness from a center line in the forward direction toward both ends in a lateral direction perpendicular to the forward direction, and the rim foil member has a central area in which the rotor blade is disposed and a side area lying on both lateral sides of the central area, wherein the side area of the rim foil member has the airfoil shape corresponding to the airfoil-shaped cross-section of the airfoil-type plate member in cross-section parallel to the forward direction.

2. The method according to claim 1, wherein a projection area of the airfoil-type plate member in plain view covers a projection area of the rotor blade.

3. The method according to claim 1, wherein:

at least some cross-sections of the rim foil member comprise a leading cross-sectional region having a leading edge at a front end thereof and a trailing cross-sectional region having a trailing edge at a rear end thereof; and an empty cross-sectional region, which is a portion of the through-hole in which the rotor blade is installed, is placed between the leading cross-sectional region and the trailing cross-sectional region.

4. The method according to claim 1, wherein, in the plate member formation step, the airfoil-shaped cross-section of the airfoil-type plate member is set to have a zero-lift angle of attack of −9 degrees to −5 degrees.

5. The method according to claim 1, wherein, in the rim foil formation step, the through-hole is formed in a direction perpendicular to a chord line of an airfoil-shaped cross-section of the rim foil member.

6. The method according to claim 1, wherein, in the rotor blade installation step, an axis of rotation of the rotor blade is placed perpendicular to a chord line of an airfoil-shaped cross-section of the rim foil member such that the chord line is parallel to the rotor blade.

7. A propulsion unit manufactured by the method according to claim 1.

8. A flying vehicle comprising:

a body; and the propulsion unit according to claim 7, the propulsion unit allowing the body to fly.

9. The flying vehicle according to claim 8, further comprising:

a fixed wing disposed between the body and the rim foil member, wherein the rim foil member and the fixed wing have the same airfoil-shaped cross section.

10. The flying vehicle according to claim 8, further comprising:

a passenger capsule coupled to the body, the passenger capsule having a forward thrust rotor blade producing forward thrust.

\* \* \* \* \*